United States Patent [19]
Gasch

[11] Patent Number: 5,967,275
[45] Date of Patent: Oct. 19, 1999

[54] TRANSMITTING COUPLING WITH MANEUVERING CHARACTERISTICS

[75] Inventor: Christian Gasch, Lohmar, Germany

[73] Assignee: GKN Viscodrive GmbH, Lohmar, Germany

[21] Appl. No.: 09/065,641

[22] Filed: Apr. 23, 1998

[30] Foreign Application Priority Data

Apr. 26, 1997 [DE] Germany .............................. 197 17 803

[51] Int. Cl.[6] ............................................... F16D 43/284
[52] U.S. Cl. ........................................... 192/35; 192/103 F
[58] Field of Search ......................... 192/35, 57, 85 AA, 192/103 F, 109 B, 109 F; 180/249

[56] References Cited

U.S. PATENT DOCUMENTS

| | | |
|---|---|---|
| 2,887,200 | 5/1959 | Mergen et al. ............................ 192/35 |
| 4,662,499 | 5/1987 | Jordan . | |
| 4,693,352 | 9/1987 | Lang et al. ...................... 192/85 AA X |
| 4,966,268 | 10/1990 | Asano .............................. 192/103 F X |
| 5,526,912 | 6/1996 | Gassmann . | |
| 5,556,343 | 9/1996 | Gassmann et al. . | |
| 5,690,201 | 11/1997 | Gassmann .................................. 192/35 |

*Primary Examiner*—Rodney H. Bonck
*Attorney, Agent, or Firm*—Howard & Howard

[57] ABSTRACT

A coupling has two parts supported one inside the other, which are rotatable relative to one another around a common longitudinal axis. Together, the parts form a chamber filled with a highly viscous fluid and which is sealed by an axially movable piston. The coupling also includes a friction coupling with friction elements, having a spring assembly which is supported on a stop part and acting on a pressure plate. When the piston is in a position of rest, the friction elements of the friction coupling are held against a further stop part under pretension generated when the relative rotation begins. In the case of axial displacement, the piston displaces the pressure plate against the force of the spring assembly towards the first stop part, with there being provided an axial gap between the piston in a position of rest and a further stop part which is displaceable towards the first stop part. An axial gap is also provided between the pressure plate and the friction elements on the one hand and the first stop part on the other hand when the piston is in a position of rest.

1 Claim, 1 Drawing Sheet

5,967,275

TRANSMITTING COUPLING WITH MANEUVERING CHARACTERISTICS

BACKGROUND OF THE INVENTION

The invention relates to a coupling comprising two parts supported one inside the other, which are rotatable relative to one another around a common longitudinal axis. Together, the parts form a chamber which is filled with a highly viscous fluid and which is sealed by an axially movable piston which is in a rest position when the two parts do not rotate relative to one another. In the chamber, between a pair of surfaces associated with the one and the other of the parts rotatable relative to one another, there is formed at least one circumferentially extending shear channel in which, in the case of a relative rotation between the parts rotatable relative to one another, pressure is built up in the fluid. The pressure loads the piston. Further, a friction coupling has friction elements which are connected to the one and the other two parts in a rotationally fast and displaceable way, and a stop part which is axially firmly associated with one of the rotatable parts, to achieve torque transmission between the rotatable parts as a function of a relative rotation.

Couplings of this type are offered by the Applicant under the name of Visco Lok couplings and have already been described in DE 43 27 519.2 and DE 43 43 307.3. On the one hand, they serve as differential locks in differential drives such as they are used in driving axles in the form of axle differentials or between two driving axles as distributor differentials. On the other hand, they can also be used on their own in the driveline of a motor vehicle wherein—only if there exists a speed differential between the axles of the vehicle—an additional axle is temporarily to be provided with torque (hang-on solution).

As the couplings do not increasingly build up a locking effect unless there exists a speed differential, their locking effect equals zero when starting the vehicle with all wheels in the stationary condition, so that it is quite possible for one wheel initially to spin if its friction coefficient relative to the road surface is different from the other ones ($\mu$ split). To avoid such wheel spin, it has already been proposed to provide a spring assembly which already loads the friction elements with a pretension when the piston is in a position of rest, so that there exists a locking effect even when the speed of all wheels is zero. However, such an assembly is disadvantageous in that it considerably aggravates slow vehicle maneuvering in the course of which it is typical for speed differentials to occur between all the steered wheels or between the steered wheels and the unsteered wheels.

SUMMARY OF THE INVENTION

It is therefore the object of the present invention to provide a coupling of this type which builds up a locking effect when the speed is zero, but at the same time permits an improved slow maneuvering behavior of the vehicle. The objective is achieved by a spring assembly which is supported on the stop part and acts on a pressure plate which, when the piston is in a rest position, holds the friction elements of the friction coupling against a further stop part under a pretension generating friction when the relative rotation begins; by a transmitting assembly by means of which the piston, in the case of axial displacement, displaces the pressure plate against the force of the spring assembly towards the first stop part; by an axial gap between the piston in the position of rest and the further stop part which is displaceable towards the first stop part; and by an axial gap between the pressure plate and the friction elements on the one hand and the first stop part on the other hand when the piston is in the position of rest. When using the device as proposed here, the friction elements, i.e. normally the friction plates of a standard multi-plate coupling, are loaded by the spring assembly when, due to the non-existence of a relative rotation between the parts rotatable relative to one another, the piston is in an unloaded position of rest. The spring assembly holds the friction elements against a further stop part which is displaceable out of a position of rest towards the spring assembly. Furthermore, the special characteristics of the coupling are ensured by two axial gaps which are arranged and function as follows. A first axial gap is provided between the piston in a position of rest and the further stop part, the effect of this measure being that, during a first part of an axial displacement path of the piston, which corresponds to a first range of speed differential between the parts rotatable relative to one another, the pressure plate is pushed back, so that, in the range of lower relative speeds, the load on the friction elements is relieved and the locking effect for slow maneuvering purposes is eliminated. The second axial gap is provided between the friction elements and the pressure plate on the one hand and the first stop part on the other hand; it ensures that after the load on the friction assembly has been relieved, the locking effect initially remains close to zero in a range of an increasing speed differential and thus with an increasing piston displacement path. Only when the second axial gap has been overcome, i.e. when, by means of the displaceable further stop part, the friction elements are moved against the first stop part and are loaded to an increasing extent, does the locking effect continue to increase, so that, under normal driving conditions, the coupling has the required locking effect.

The range of lower locking effects normally covers speed differentials ranging between 5 and 20 rpm.

BRIEF DESCRIPTION OF THE DRAWINGS

A preferred embodiment of the invention will be described below with reference to the drawings wherein.

DETAILED DESCRIPTION

Figure 1A:
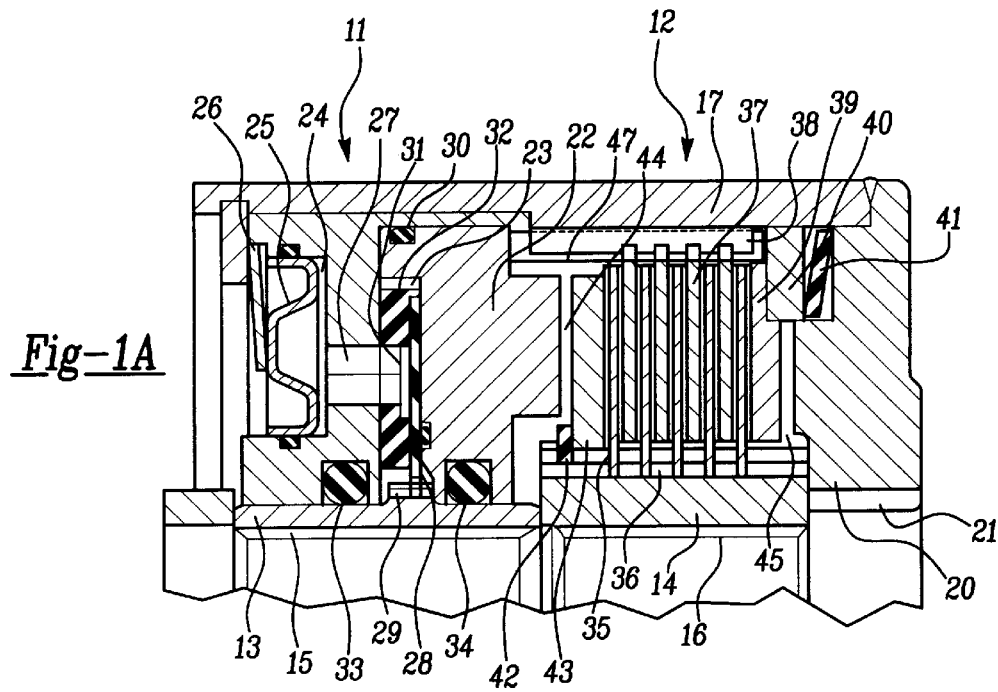
FIG. 1A shows half a longitudinal section through an inventive coupling.

In FIG. 1A, the coupling is provided with a pressure generating unit 11 and a friction coupling unit 12, which each comprise components connected to two parts rotatable relative to one another. The first one of the parts mentioned first substantially comprises two hubs 13, 14 which are produced separately from one anther, but which are each provided with inner teeth 15, 16 into which it is possible to insert a shaft journal or a sleeve which leads to the rotationally fast coupling of the hubs 13, 14. The second one of the parts rotatable relative to one another substantially comprises a housing with a cylindrical casing 17 at one end of which there is inserted a first cover 18 which is axially supported on the casing 17 by a securing ring 19. At the second end, a second cover 20 is welded on.

The cover 20 is provided with inner teeth 21 for the purpose of being connected to a second shaft journal. The first cover 18 is positioned in the second one of the rotatable parts in a rotationally fast way and, together with the piston 22, forms a chamber 23 which is filled with a highly viscous fluid. The piston 22 is axially movable relative to the cover 18 and preferably rotates jointly therewith. In the cover 18 there is formed a reservoir 24 which is sealed by a movable annular piston 25 which is resiliently supported on a plate spring 26. The reservoir 24 is connected to the above-mentioned chamber 23 by means of a channel 27. In the chamber 23 there rotates a rotor 28 which, by means of teeth 29, is connected to the hub 13 in a rotationally fast way. The rotor 28 forms a circumferentially extending shear channel 31 which is delimited by a control member 32 which substantially rotates with the cover 18 and is rotatable relative thereto to a limited extent only. Due to the fluid shear in the shear channel 32, a relative rotation between the rotor 28 and the cover 18 leads to an increase in pressure in the chamber 23 and thus to axial displacement of the piston 22. The cover 18 and the piston 22 are sealed by seals 33 and 34 respectively relative to the hub 13 and by a seal 30 relative to one another.

The friction assembly comprises inner friction plates 35 which, by means of longitudinal teeth 36, are connected to the hub 14 in a rotationally fast way, with their axial movability being retained. Furthermore, the friction assembly comprises outer friction plates 37 which cooperate with inner teeth 38 of the sleeve 17 and are thus connected thereto in a rotationally fast way while retaining their axial movability. In the illustration axial air gaps between the inner friction plates 35 and the outer friction plates 36 are exaggerated in their size. At the opposite end of the friction plates, with reference to the piston, there is arranged a pressure plate 39 which can be loaded by an axially movable pressure plate 40, which, in turn, is loaded by a plate spring 41 which is supported on the cover 20 acting as the first stop part. At the end of the coupling assembly, on the side of the piston, there is provided a securing ring 42 on the hub 14, on which securing ring 42 there is supported a second pressure plate 43 which acts as the second stop part. Between the piston 22 and the pressure plate 43 there can be seen a first axial gap 44. Between the pressure plate 39 and the cover 29 there is provided a second axial gap 45. The piston 22 is shown in its position of rest. The pretension of the plate spring 41 moves the pressure plate 39 towards the left and causes the friction elements to stop against the pressure plate 43 and the securing ring 42.

Figure 1B:
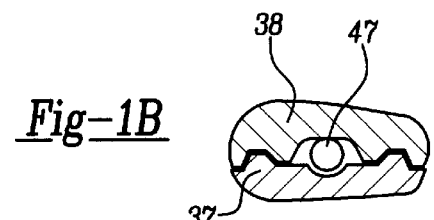
FIG. 1B shows a detail of the FIG. 1A coupling.

As shown in FIG. 1B, between the piston 22 and the pressure plate 39 there is provided a plurality of at least three circumferentially distributed push rods 47 which extend through the friction plates. When the piston 22 moves axially, the friction plates are initially freed from the load applied by the plate spring 41. Only when both air gaps 44, 45 are overcome due to the axial movement, is a coupling effect built up between the friction plates with an increasing differential speed.

Figure 2:
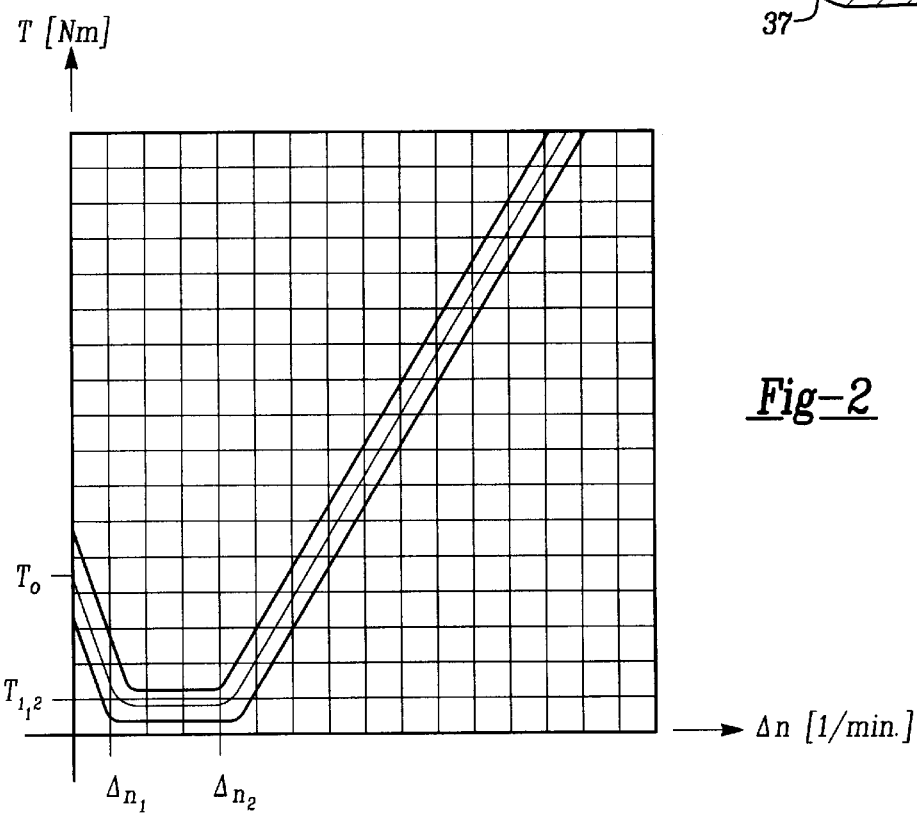
FIG. 2 shows the characteristic curve of an inventive coupling, with the transferable torque (T) being illustrated as a function of the speed differential n.

FIG. 2 shows the characteristic curve of the friction coupling according to FIG. 1. The torque T is shown in Nm as a function of the speed differential $\Delta n$ between the first one and the second one of the parts rotatable relative to one another, in rpm. If the speed differential is zero, there occurs a torque of rest $T_o$ which, with an increasing speed up to the speed differential $\Delta n_1$ decreases linearly down to the value $T_{1,2}$. This value remains constant in a range between a speed differential $\Delta n_1$ and a speed differential $\Delta n_2$ from where it increases linearly with an increasing speed differential. It has already been explained above how this curve occurs.

Preferred embodiments have been disclosed. However, a worker in the relevant art would recognize that modifications would come within the scope of this invention.

What is claimed is:

1. A coupling comprising:

two parts supported one inside the other, and rotatable relative to one another around a common longitudinal axis and which, together, form a chamber filled with a highly viscous fluid and which is sealed by an axially movable piston which is in a position of rest when the two parts do not rotate relative to one another, and in which said chamber, between a pair of surfaces associated with the one and the other of the parts rotatable relative to one another, there is formed at least one circumferentially extending shear channel in which, if relative rotation occurs between said two parts, pressure is built up in the fluid, which pressure loads said piston, and further comprising a friction coupling with friction elements connected to said one and the other of said parts rotatable relative to one another in a rotationally fast and axially displaceable way, and a stop part axially firmly associated with one of said rotatable parts, to achieve torque transmission between said rotatable parts as a function of relative rotation;

a spring assembly supported on said stop part and acting on a pressure plate which, when said piston is in the position of rest, holds said friction elements of said friction coupling against a further stop part under a pretension generating friction when relative rotation begins;

a transmitting assembly by means of which said piston, in the case of axial displacement, displaces said pressure plate against the force of said spring assembly towards said first stop part;

an axial gap between said piston in the position of rest and said further stop part which is displaceable towards said first stop part; and an axial gap between said pressure plate and said friction elements on the one hand and said first stop part on the other hand when said piston is in the position of rest.

* * * * *

UNITED STATES PATENT AND TRADEMARK OFFICE
CERTIFICATE OF CORRECTION

PATENT NO. : 5,967,275
DATED : October 19, 1999
INVENTOR(S) : Christian Gasch

It is certified that error appears in the above-identified patent and that said Letters Patent is hereby corrected as shown below:

In Column 1, Line 19, insert after "the other" the phrase -- of the --.
In Column 3, Line 13, delete "32" and replace with -- 31 --.
It is also noted that in Fig. 1A: plate spring 41, securing ring 42 and rotor part 28 should be shown as metal parts; and control member 32 should be shown as a composite plastic part.

Signed and Sealed this

Twenty-seventh Day of March, 2001

*Attest:*

NICHOLAS P. GODICI

*Attesting Officer*  Acting Director of the United States Patent and Trademark Office